Feb. 19, 1957   R. A. DEIBEL   2,781,540
WINDSHIELD WIPER ARM MOUNTING
Filed Oct. 27, 1954
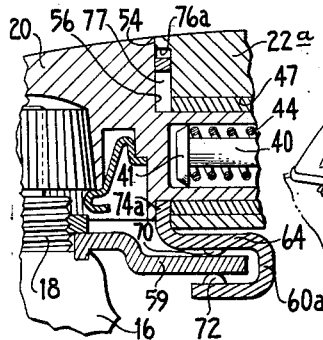
Fig. 6
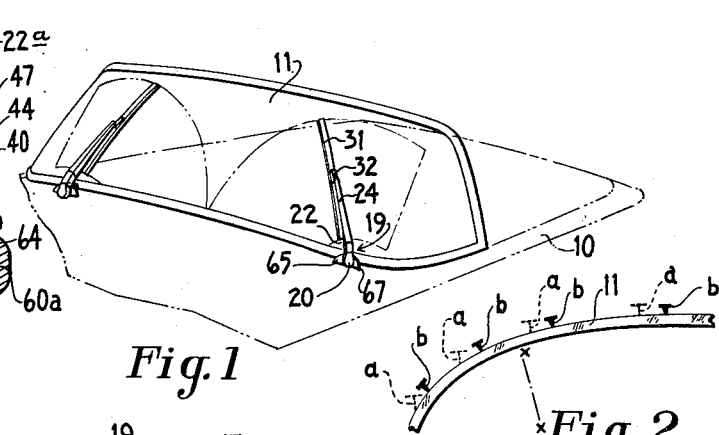
Fig. 1
Fig. 2
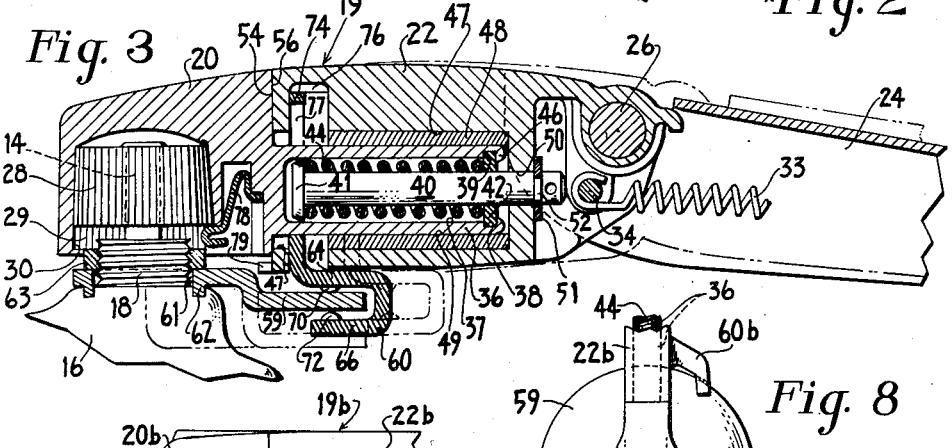
Fig. 3
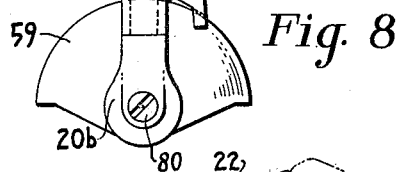
Fig. 8
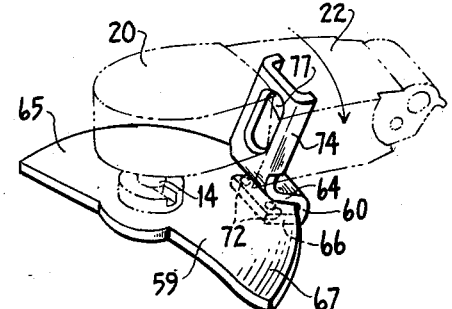
Fig. 7
Fig. 5
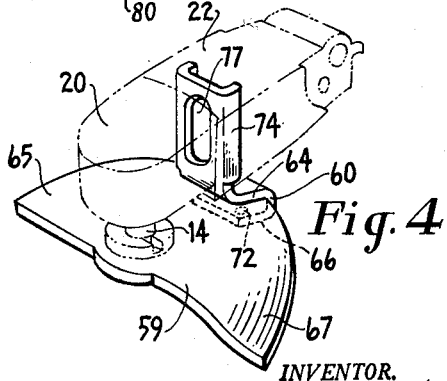
Fig. 4
INVENTOR.
Raymond A. Deibel
BY
Beau, Brooks, Buckley & Beau,
ATTORNEYS.

United States Patent Office 2,781,540
Patented Feb. 19, 1957

2,781,540

WINDSHIELD WIPER ARM MOUNTING

Raymond A. Deibel, Cheektowaga, N. Y., assignor to Trico Products Corporation, Buffalo, N. Y.

Application October 27, 1954, Serial No. 464,967

15 Claims. (Cl. 15—255)

This invention relates to the windshield cleaning art and more particularly to windshield cleaners for curved windshields.

The curved windshields currently in general use on automobiles and other vehicles have irregularly curved surfaces with the curvature being considerably more pronounced at the sides of the windshield than at the central front part thereof which, although curved, is usually relatively flat. One current type of curved windshield, commonly known as the "wrap-around" or "panoramic" windshield, has a very sharp change in curvature at its sides as compared to its central front portion, so that the windshield wiper blade must sweep around a corner to wipe the sides of the windshield.

Windshield cleaners heretofore used for such curved windshields generally comprise a squeegee or blade made of rubber or other like plastic flexible material having a relatively thin wiping edge engaging the windshield, and the wiping edge extends from an enlarged body portion that is usually somewhat loosely supported in a flexible metal backing strip so that the blade is substantially normal to the strip. The backing strip is generally in turn attached at spaced points to a flexible pressure distributing wiper frame or holder by a plurality of spaced claws on the holder which slidably engage the sides of the backing strip, and the holder or frame is suitably secured to a wiper arm mounted on a wiper rock shaft that oscillates about a single fixed axis. This windshield wiper arrangement is of such construction that the attitude of such parts as the wiper blade, backing strip, and holder frame changes with relation to the windshield surface as the wiper moves from the front part of the windshield to its sides. When the wiper is at the front part of the windshield at the beginning of its outward stroke, the wiper blade or squeegee is substantially normal to the windshield surface and the backing strip is substantially parallel to the adjacent portion of the windshield surface. However, when the wiper is at the side of the windshield beginning its inward stroke, the wiper blade is at a small acute angle relative to the windshield surface and the backing strip is almost normal to it with one edge of the strip and the strip-engaging claws of the holder frame being spaced only a small distance from the windshield surface. When the windshield surface is only partially wet, or is sticky for some other reason, the wiper element of the blade tends to cling abnormally to the glass surface, producing a drag on the wiper element that causes metal parts of the windshield wiper, such as the side of the backing strip and the claws on the holder frame, to contact the glass surface. This mars and scratches the windshield, especially at its sides, frequently necessitating replacement of the windshield. Also, parts of the wiper arrangement sometimes become misshapen in handling and assembly or replacement of worn wiper blades to such extent that the backing strip and holder frame claws contact and mar the sides of a wrap-around windshield even when it is not abnormally sticky. Curved windshields currently in use on automobiles are very expensive to replace, particularly the wrap-around type, and it is therefore important to eliminate the possibility that the windshield cleaner will scratch or mar the windshield.

When wiper blades are displaced from an attitude normal to the windshield surface beyond certain limits so that the acute angle of inclination between the blade and the windshield surface during wiping operation is too small, the wiper blade may improperly function and cause a chattering on the return stroke and thereby impair the visibility. Windshield cleaners for curved wrap-around windshields have heretofore been constructed so that the blade assumes a proper wiping position in the relatively flat portion at the front of the windshield, and yet assume an improper angle on the windshield surface at its side corners resulting in the aforementioned chattering action, particularly when the windshield is only partially wet or sticky.

The present invention contemplates a novel windshield cleaner arrangement for curved windshields, and especially for irregularly curved windshields, which incorporates a novel means for controlling the attitude of the windshield wiper relative to the windshield surface during wiper operation to eliminate the aforementioned difficulties.

It is therefore a principal object of the present invention to provide a windshield cleaner means for curved windshields which effectively controls the attitude of the wiper blade, wiper backing strip and wiper holder frame with respect to the windshield surface during wiper oscillation to avoid contact between any metal parts of the windshield cleaner mechanism and the windshield surface, thereby preventing such metal parts from scratching or marring the windshield.

It is a related object of this invention to provide for irregularly curved windshields having sharp changes in curvature, a windshield cleaner means in which the squeegee backing strip and the strip engaging claws of the wiper holder frame are maintained substantially parallel to the tangent at any part of the windshield surface and the wiper blade is maintained substantially normal to the windshield surface at any part thereof, even when the wiper sweeps around the corner at the side of the windshield, thereby preventing contact between the windshield and metal parts of the wiper during wiping operation and eliminating blade chattering.

It is still another object of the present invention to provide a windshield cleaner for curved windshields that uses a simple and economical straight wiper drive shaft oscillating about a single fixed axis and includes means for normalizing the wiper relative to the curved windshield surface during wiping operation.

It is another object of this invention to provide for irregularly curved windshields having sharp changes in curvature a relatively simple, efficient windshield cleaner in which the attitude of the wiper blade and wiper holder frame relative to the windshield is varied during the wiping operation by a controlled displacement of the wiper arm about its longitudinal axis as it oscillates.

It is still a further object of the present invention to provide a windshield cleaner for curved windshields which is of practical design and economical construction.

The foregoing and other objects will manifest themselves as this description progresses, reference being made therein to the accompanying drawings, wherein:

Figure 1 is a perspective view depicting part of a vehicle having a panoramic or wrap-around windshield and embodying the windshield cleaner of the present invention;

Figure 2 is a diagrammatic sketch of a wrap-around windshield and wiper illustrating a comparing the attitude of the wiper blade and holder frame with respect to the windshield at various wiper positions for windshield cleaners constructed according to the present invention and according to the prior art;

Figure 3 is a fragmentary longitudinal sectional view of the wiper carrying arm in one embodiment of the present invention, showing in detail the shaft mounting section and wiper position control means on said arm;

Figure 4 is a schematic perspective view of the shaft mounting section and position control means of the wiper arm when the wiper blade is at the relatively flat front portion of the vehicle windshield;

Figure 5 is a perspective view similar to Figure 4 illustrating the rotation of the wiper carrying arm when the wiper blade is at the curved side or corner of the windshield to adjust the attitude of the wiper relative to the windshield;

Figure 6 is a fragmentary sectional view similar to Figure 3 showing a modified form of position control means for the wiper arm;

Figure 7 is a fragmentary side view of another modification including a modified shaft mounting section and wiper position control means; and Figure 8 is a fragmentary plan view of the modification shown in Figure 7.

Referring to the drawings, the numeral 10 designates a motor vehicle with a wrap-around windshield 11 having a pronounced curvature at its sides forming a corner. Referring particularly to Figure 2, there is seen a diagrammatic plan view sketch of part of windshield 11 illustrating the attitude of the windshield wiper relative to the windshield surface in various positions during wiper operation. The small T-shaped figures *a* and *b* represent a wiper according to the prior art and the present invention, respectively, with the stem of the T indicating the wiper blade and the cross bar of the T representing the wiper blade backing strip and wiper holder frame. In windshield wipers heretofore in use, the wiper holder frame and backing strip stay substantially normal to the wiper drive shaft axis *x—x* during wiper oscillation so that the attitude of the wiper blade and holder relative to the windshield changes as the wiper moves across the windshield surface in a manner diagrammatically illustrated by the various positions of T-shaped wipers *a* in Figure 2. It will be noted that when the prior art wiper *a* is at the side of the wrap-around windshield 11, the blade is at a small acute angle thereto and the wiper holder frame and backing strip are almost in contact with the windshield surface. Thus, drag on the wiper blade on the inward stroke of the wiper sometimes causes the metallic parts of the wiper backing strip and holder frame to contact the windshield and mar or scratch it, particularly when the windshield is only partly wet or is sticky. An improper angle between the blade and windshield surface also frequently causes the wiper to chatter across the sides of the windshield thereby impairing the driver's vision.

According to the present invention there is provided a novel means, presently described, which controls the attitude of the wiper blade and the wiper holder frame and wiper blade backing strip to maintain the blade substantially normal to the windshield and to also maintain the wiper backing strip and holder frame substantially parallel thereto throughout the wiper stroke. This is illustrated by the T-shaped wipers *b* in Figure 2. Thus the present invention prevents marring or scratching of the windshield surface by metallic parts of the wiper and also eliminates the aforementioned chattering action making the wiper operate more efficiently.

Referring more particularly to Figures 1, 3, 4 and 5, an oscillatory drive shaft 14 for actuating a wiper arm is journalled at the lower side of the windshield 11 in a suitable bearing member 16 which has a threaded extension 18 projecting therefrom, for a purpose to be later described. The wiper arm unit comprises a shaft mounted and wiper control means indicated generally at 19 which includes a shaft mounted section 20 and an arm-mounting section 22 to which a wiper carrying arm 24 of conventional design is pivotally connected by pivot 26. The wiper drive shaft 14 has an enlarged head 28 provided on its periphery with a series of longitudinally extending serrations or flutes that engage with coacting grooves 29 formed in socket 30 in shaft-mounted section 20 of wiper control assembly 19, whereby the wiper arm 24 oscillates with drive shaft 14. A wiper 31 of suitable construction is connected to the end of arm 24 by a suitable attaching clip 32 so that when shaft 14 oscillates, the wiper arm 24 and wiper 31 are moved back and forth across the surface of the windshield 11. Suitable means is provided to impose the desired wiping pressure on wiper 31 as, for example, a tension spring 33 connected to arm mounting section 22 at pin 34, with its other end (not shown) being similarly connected to arm 24 to urge the outer end of arm 24 and the wiper 31 towards the windshield 11.

Referring particularly to Figure 3, the shaft-mounted section 20 of wiper arm control assembly 19 is provided with a hollow cylindrical shaft 36 having a central longitudinally extending bore 37 with an enlarged bore 38 adjacent the open end thereof forming a shoulder 39. A pin 40 having a head 41 is received within bore 37 with the pin extending through the center of an annular washer 42 and a coil spring 44 that bears at one end against pin head 41 and at its other end against washer 42. The washer 42 is secured in enlarged bore 38 against shoulder 39 by deforming the open end of shaft 36 in any appropriate manner, such as heading or spinning, to form a retaining flange 46. Arm-mounting section 22 has a longitudinally extending bore 47 in part of which a bearing sleeve 48 is suitably retained, as by a press fit, and hollow shaft 36 on section 20 is received in the inner bore 49 of bearing sleeve 48 so that arm mounting section 22 and wiper arm 24 are journalled thereon for rotation relative to section 20. Bearing sleeve 48 may be a self-lubricating type, such as an oil impregnated sintered bearing, so that the bearing surfaces between journal shaft 36 and sleeve 48 are well lubricated to permit easy relative rotation between sections 20 and 22. It will be understood, however, that sleeve 48 could be dispensed with altogether and bore 47 made of smaller size so that section 22 is journalled directly on shaft 36. Arm-mounting section 22 has a second smaller bore 50 in concentric communication with bore 47 which receives the end of pin 40, and section 22 is retained on shaft 36 of section 20 by a suitable retaining ring 51 engaged in annular groove 52 adjacent the end of pin 40. Arm-mounting section 22 is thereby rotatably coupled to shaft-mounted section 20 with spring 44 acting against head 41 of pin 40 to yieldably urge these sections together so that flat end surface 54 of section 22 normally abuts against matching flat end surface 56 of section 20.

A position control means such as a cam and follower arrangement is provided to rock the arm mounting section 22 and arm 24 about journal shaft 36 of section 20 to adjust the attitude of wiper 31 relative to the windshield surface as it oscillates back and forth across windshield 11. The illustrated embodiment of Figures 3–5, includes a cam and follower arrangement for rocking wiper arm 24 comprising a cam plate 59 of generally semi-circular shape non-rotatably mounted on drive shaft bearing 16 and cooperating with a follower member 60 on arm mounting section 22. Drive shaft 14 and threaded bearing extension 18 extend through a circular aperture 61 in cam plate 59 which is non-rotatably secured to shaft bearing 16 by a pair of keys 62 fitting into suitable recesses in the exterior of bearing 16 and retaining nut 63 threaded on bearing extension 18. It will be apparent that cam 59 could be mounted on the vehicle frame rather than on the bearing as shown, but the described arrangement is compact, simple and efficient and is therefore preferable.

Cam 59, which may be economically produced by stamping from sheet stock, is provided with a suitable control contour and, as illustrated in Figures 3–5, it includes a first substantially flat section 65 disposed towards the center of the windshield 11 and a second section 67 disposed towards the side of the windshield and bent downwardly towards the cowling of the vehicle 10. The cam is interposed between opposed sides 64 and 66 of a U-shaped section on cam follower 60, each side having a pair of spaced hemispherical protuberances 70 and 72 in engagement with opposite surfaces of cam 59. Protuberances 70 and 72 provide substantially point contacts with cam 59 thereby enabling the follower 60 to move easily over curved sections of the cam and with a minimum of friction and wear therebetween. Cam follower member 60 may be fixedly connected to the arm section 22 while the anchoring section 20 moves along the axis of the shaft 14. Or, as shown, a reverse arrangement may be resorted to for which purpose the follower will include a channel-shaped section 74 that is slidably received in a rectangularly shaped slideway recess 76 in section 22 with the web of section 74 having an elongated slot 77 through which shaft 36 is passed during assembly of arm sections 20 and 22, so that slot 77 permits cam follower member 60 to slide back and forth in recess 76 of section 22. The wiper arm unit comprising control assembly 19, wiper arm 24, and cam follower 60 is easily and quickly mounted on, or removed from, the oscillatory drive shaft 14 by separating sections 20 and 22 against the action of coil spring 44 so that section 22, wiper arm 24, and cam follower 60 are in the dotted line position shown in Figure 3. In this position, the lower side 66 of the U-shaped follower section clears cam 59 so that the fluted socket 29 of shaft-mounted section 20 can be mounted on or removed from the shaft head 28. As a secondary function, the cam follower 60 holds the wiper arm unit on drive shaft head 28, but if desired a resilient latch member 78 that interlocks with the underside of head 28 may also be provided for this purpose. A pair of small lugs 79 may be provided on section 22 at each side thereof to limit the extent that section 22 may be rocked with respect to section 20, principally as an aid in assembly of the arm unit on the drive shaft.

The operation of the above-described windshield cleaner is as follows: When the drive shaft 14 is oscillated by the drive means for the cleaner system, the wiper arm unit including the assembly 19 and arm 24 rock back and forth across the windshield 11 with wiper 31. Since cam follower 60 is mounted in section 22 of the wiper arm control assembly 19, it correspondingly moves back and forth about cam 59, and coaction between the cam 59 and protuberances 70 and 72 causes follower member 60 to rock about shaft 36. This in turn rocks section 22 about shaft 36 to control the attitude of wiper 31 relative to the windshield surface 11. Thus, referring to the windshield wiper on the right in Figure 1, and Figures 4 and 5, when the wiper 31 is at the front part of windshield 11, section 22 is in "normal" position as in Figure 4. When, however, the wiper is at the side of the windshield 11, the downwardly deflected section 67 on cam 59 causes follower member 60 to rotate clockwise about the longitudinal axis of the wiper arm unit, in turn rotating section 22 clockwise on the journal shaft 36 extending from section 20, as in Figure 5. This rocks the wiper arm 24 and wiper 31 correspondingly so that the holder frame and blade backing strip of wiper 31 are rotated to a position substantially parallel to the windshield surface, and the wiper blade is maintained substantially normal thereto, as the wiper passes over the curved side corner of the windshield 11. In this way, contact between the metal parts of the wiper and the windshield surface is prevented, and chatter of the wiper across the windshield is eliminated.

In Figure 6 there is shown a modification of the present invention, and for clarity like parts are identified with like numerals as in Figures 3–5. The modification of Figure 6 is virtually the same as the above-described embodiment of Figures 3–5 excepting for the form of cam follower 60a and follower slideway recess 76a. The slotted upright part 74a of follower member 60a is flat, instead of channel-shaped as in the embodiment of Figures 3–5, and it is slidably received in a rectangular slideway formed by the end surface 56 of section 20 and a rectangular shaped recess 76a formed in the end 54 of section 22a, as shown in Figure 6. The modification of Figure 6 is otherwise the same as the embodiment of Figures 3–5 and it will be apparent that it operates in the same manner.

Referring to Figures 7 and 8, there is shown another modification of the present invention which is also generally similar to that of Figures 3–5. Shaft mounting and wiper control means 19b comprises a shaft-mounted section 20b and arm-mounting section 22b which are the same as sections 20 and 22, respectively, in Figures 3–5 excepting that section 20b is secured to the oscillating drive shaft of the cleaner system by a screw 80 in a manner well known in the art. Further, the section 22b has a rigidly related cam follower 60b extending from one side thereof with a pair of spaced opposed fingers 64b and 66b at the end thereof engaging opposite sides of cam plate 59 which is suitably non-rotatably mounted on the drive shaft bearing. In this instance, the drive shaft 14 is mounted to play lengthwise. When the wiper arm unit including wiper control means 19b is rocked due to oscillation of the cleaner drive shaft, fingers 64b and 66b are displaced by cam 59 thereby rocking follower 60b and section 22b. This in turn rocks the wiper supported on section 22b thus controlling the attitude of the wiper relative to the windshield in like manner as in the above-described embodiment of Figures 3–5. To engage or disengage the follower 60b, it is only necessary to pull outwardly on the section 22b against the coil spring 44.

The windshield surface may be of such curvature and the axis of the drive shaft so placed with respect to the windshield that the wiper holder and wiper blade will assume the most efficient attitude at some point during the central portion of its wiping stroke and will deviate therefrom to an undesirable extent when the wiper is at the center of the windshield as well as when at its side. In such case, the present invention affords a means for controlling the attitude of the wiper and wiper blade throughout their oscillatory travel by use of a cam of suitable contour. For example, cam 59 in Figures 3–5 could be replaced by a similar cam which is deflected towards the vehicle cowling at both ends. In such case, when the wiper is at the side of the windshield, the wiper holder and blade will rock in one direction to correspondingly adjust the wiper's attitude relative to the windshield. Then when the wiper is adjacent the central portion of the windshield at the other end of its stroke, the wiper holder and blade will be oppositely rocked to adjust the attitude of the wiper relative to the windshield in the other direction.

From the foregoing, it will be apparent that the present invention provides a windshield cleaner for irregularly curved windshields having sharp changes in curvature that includes practical, effective and economical means for controlling the attitude of the wiper holder and blade relative to the windshield surface during wiper operation, so that the blade is maintained substantially normal to the windshield during the wiper stroke and contact between the metal parts of the wiper and the windshield is prevented; and that the windshield cleaner of this invention therefore prevents metal parts of the wiper from scratching or marring the windshield, and further eliminates chattering of the wiper across the windshield.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A windshield cleaner for a curved windshield, comprising an oscillatory drive shaft, a wiper arm unit fixed thereon, a wiper blade carried by the arm back and forth across the windshield when said drive shaft oscillates, means for adjusting the attitude of said wiper relative to the windshield to maintain the wiper blade substantially normal to the windshield surface during such wiper movement, said means including cooperating cam and follower parts with one part straddling an edge of the other part to enable separation upon relative movement lengthwise of the arm, and yieldable means normally holding the parts in a cooperating relationship while yielding to permit their separation.

2. A windshield cleaner for irregularly curved windshields, comprising an oscillatory drive shaft, a wiper arm fixed thereon and carrying a wiper for back and forth movement over the windshield surface when said drive shaft is oscillating, said wiper arm comprising a shaft anchored section and a wiper carrying section slidably and pivotally connected to the shaft anchored section, a pair of cooperating cam and follower parts one fixed and the other mounted on the wiper carrying section and one part straddling the other to enable separation by and upon sliding the wiper carrying section lengthwise outwardly on the shaft anchored section, said parts cooperating to hold the wiper attitude relative to the windshield surface substantially constant in its movement across the curved windshield surface.

3. A windshield cleaner for a curved windshield, comprising an oscillating drive shaft, a wiper arm non-rotatably supported on said shaft, a wiper carried by the arm, a fixed cam part over which the arm oscillates, and a cooperating cam part straddlingly related to the first part and mounted on the arm and having a movement toward and from the shaft to disengage and reengage the first part, said arm having a laterally rockable wiper carrying section on which the cooperating cam part is mounted for adjusting the attitude of said wiper relative to said windshield surface.

4. A windshield cleaner for curved windshields, comprising an oscillatory drive shaft, a wiping arm unit on said drive shaft including a shaft-mounted section non-rotatably mounted on the end of said shaft, an arm-mounting section rockable about its longitudinal axis on said shaft mounted section and yieldably extensible therefrom, and a wiper carrying section supported on said second section; a wiper mounted on said wiper carrying section so that rocking of said drive shaft causes said wiper to oscillate back and forth over said windshield, and means having a part carried by the second section and detachably interlocked by its yieldable extension for rocking said arm mounting section and wiper relative to said shaft mounted section during oscillatory movement of said wiper to control the attitude of the wiper relative to said windshield.

5. A windshield cleaner for curved windshields, comprising an oscillatory drive shaft, a wiping arm unit on said drive shaft including a shaft-mounted section non-rotatably secured to the end of said shaft, an arm-mounting section rotatably supported by said shaft mounted section, and a wiper carrying section supported by said second section; a wiper mounted on said carrying section to oscillate back and forth over said windshield in wiper operation, control means including cam and follower means associated with said arm-mounting section and rocking said section and the wiper thereon relative to said shaft-mounted section as the wiper oscillates to control the attitude of said wiper relative to said windshield, said arm-mounting section being distensible from the shaft mounted section to detachably engage the cam and its follower.

6. A windshield cleaner for a vehicle having a curved windshield, comprising a bearing on said vehicle and an oscillatory drive shaft rotatably mounted in said bearing to rock about a single fixed axis; a wiper arm unit non-rotatably supported on said drive shaft including a shaft-mounted section non-rotatably secured to said drive shaft, an arm-mounting section rotatably supported on said shaft-mounted section, and a wiper carrying section supported on said arm-mounting section, a wiper mounted on said carrying section, cam and follower means for controlling the attitude of said wiper relative to said windshield and including a cam non-rotatably supported on said vehicle, and a follower on said arm-mounting section coacting with said cam to rotate said arm-mounting section relative to said shaft-mounted section to change the attitude of the wiper as it oscillates across the windshield due to rocking of said drive shaft, said arm mounting section being distensible from said shaft-mounted section to disengage said cam and follower means, and means normally holding said cam and follower means engaged.

7. A windshield cleaner for a vehicle having a curved windshield as recited in claim 6, wherein said cam is non-rotatably secured to said drive shaft bearing.

8. A windshield cleaner for curved windshields, comprising an oscillatory drive shaft and a bearing therefor, a wiping arm unit on said drive shaft including a shaft-mounted section non-rotatably mounted on the end of said shaft, an arm-mounting section rockably supported on and slidable lengthwise of said shaft-mounted section, and a wiper carrying section supported on said second section, said arm-mounting section having a slideway recess therein, a wiper mounted on said arm, means for controlling the attitude of said wiper relative to said windshield, said means including a cam plate non-rotatably supported on said bearing with a positive acting cam follower in operative engagement therewith, said follower being slidably and non-rotatably received in said slideway recess in the arm-mounting section so that as the wiper oscillates back and forth across the windshield due to rocking of said drive shaft the cam actuates said follower causing it to rock said arm mounting section and the wiper thereon to change the attitude of the wiper relative to the windshield, said follower being displaceable from the cam upon distending said arm-mounting section on said shaft-mounted section.

9. A windshield cleaner for curved windshields, comprising an oscillatory drive shaft, a wiping arm unit on said drive shaft including a shaft mounted section non-rotatably mounted on the end of said shaft, an arm-mounting section rockably supported on said shaft mounted section, and a wiper carrying section supported on said second section, said first and second sections having abutting end faces with a slideway recess formed in the end face of said second section and the end face of said first section providing a wall for said slideway; a wiper mounted on said carrying section for back and forth movement over said windshield in wiper operation, attitude control means including a fixed cam plate and a positive acting cam follower in operative engagement therewith, said follower being slidably and non-rotatably received in said slideway recess in the arm-mounting section so that as the wiper oscillates back and forth across the windshield due to rocking of said drive shaft the cam actuates said follower causing it to rotate said arm-mounting section to adjust the attitude of the wiper relative to the windshield.

10. A windshield cleaner for a curved windshield on a vehicle, comprising an oscillatory drive shaft and a bearing therefor, a shaft-mounted first section of a wiper arm unit non-rotatably secured to said shaft and having a cylindrical shaft projecting therefrom, an arm-mounting second section having a longitudinally extending bore therein rotatably journalled on said shaft of the first section and having a slideway recess extending therein transversely to said bore, means for yieldably urging said first and second sections into engagement for normal operation and permitting longitudinal movement of the second section along the cylindrical shaft, a wiper carrying section supported on said second section, a cam plate non-rotatably supported on said bearing, and a cam follower having a slide section slidably received in said recess in the arm-mounting section and a U-shaped part extending transversely from said slide section, said cam plate being interposed between opposite sides of said U-shaped part so that as the wiper oscillates due to rocking of the drive shaft the cam follower traverses the cam and is actuated by it to cause rotation of the wiper arm mounting section thereby adjusting the attitude of the wiper relative to the windshield.

11. A windshield cleaner for curved windshields as defined in claim 10 wherein said U-shaped follower part engages opposite sides of said cam to a sufficient extent so that it serves to retain the wiper arm unit on the drive shaft.

12. A windshield cleaner as defined in claim 10, further comprising a pair of spaced protuberances on each side of said U-shaped part in engagement with opposite sides of said cam plate.

13. A windshield cleaner as defined in claim 10 wherein said means for yieldably urging said first and second sections together comprises a bore in said shaft on the first section, a pin received in said bore, a spring retained in said bore by a closure member at the end thereof with said spring engaging said pin and urging it towards said first section, and means for connecting said pin to said second section so that it is urged towards the shaft-mounting section under the action of said spring.

14. A windshield cleaner for a vehicle having a curved windshield, comprising a bearing on said vehicle and an oscillatory drive shaft rotatably mounted in said bearing to rock about a fixed axis, a wiper arm unit supported on said drive shaft including a shaft mounted section non-rotatably secured to said drive shaft, an arm-mounting section rotatably supported on said shaft mounted section, and a wiper carrying section supported on said arm mounting section, a wiper mounted on said carrying section to move said wiper back and forth over said windshield, cam and follower means including a cam non-rotatably supported on said bearing and a rigid follower carried by said arm-mounting section and having means coacting with said cam so that the cam moves the follower and arm-mounting section relative to the shaft-mounted section and a normal attitude of the wiper relative to the windshield surface will be maintained as the arm unit oscillates across the windshield, said follower being mounted for movement to disengage the same from said cam, and means normally holding said cam and said follower operatively engaged.

15. A vehicle window cleaner adapted for use on curved window surfaces comprising, an oscillating drive shaft, a wiper actuating arm supported on said shaft for oscillation thereby, said actuating arm having a mounting section supported on said shaft and a wiper carrying section, said wiper carrying section being laterally rockable relative to said arm for adjusting the attitude of a wiper carried thereby relative to an associated window surface, and means for so rocking said wiper carrying section including cooperating cam and follower parts, one of said parts being fixed against movement axially outwardly relative to said shaft and the other of said parts straddling an edge of said one part to prevent removal of said arm from said shaft and being mounted for movement out of engagement with said one part, and means yieldably holding said parts operatively engaged.

References Cited in the file of this patent
UNITED STATES PATENTS
2,691,186    Oishei et al. _____ Oct. 12, 1954